C. W. HAAS.
MARKER ATTACHMENT.
APPLICATION FILED FEB. 7, 1910.
984,215.
Patented Feb. 14, 1911.
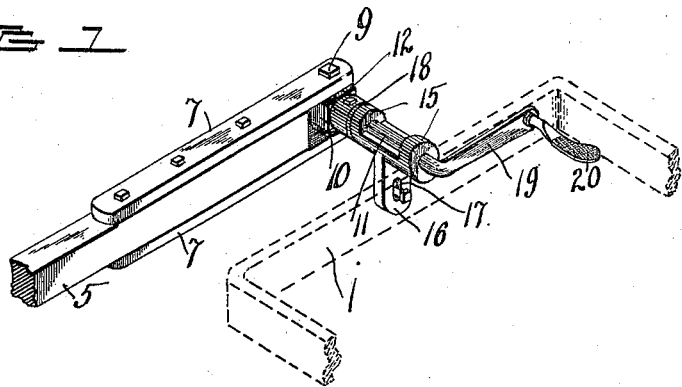
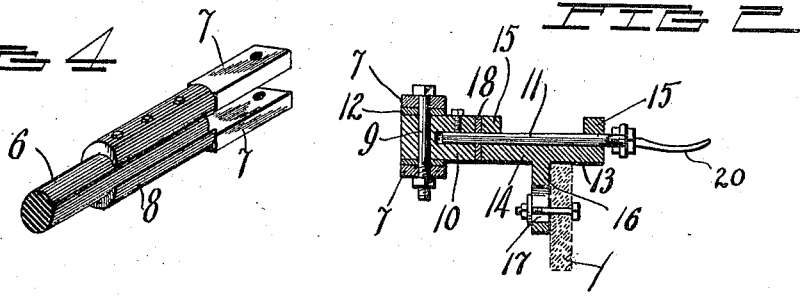
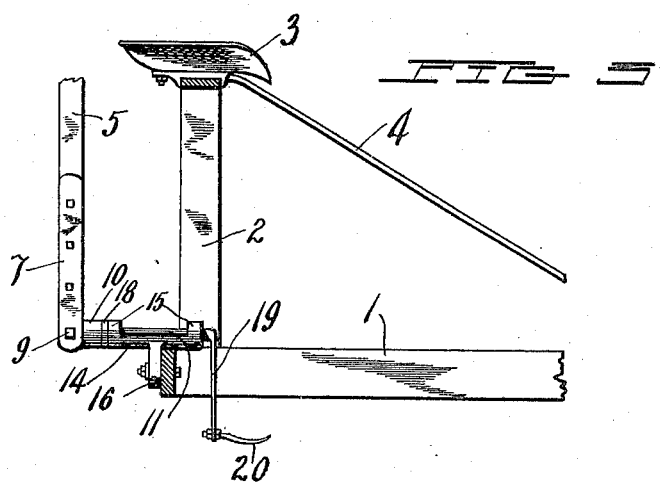
Witnesses
Robert Plowe
George Haas.
Inventor
Charlie W. Haas
By Chas. N. LaPoste
Atty

UNITED STATES PATENT OFFICE.

CHARLIE W. HAAS, OF PEORIA, ILLINOIS.

MARKER ATTACHMENT.

984,215.   Specification of Letters Patent.   Patented Feb. 14, 1911.

Application filed February 7, 1910. Serial No. 542,489.

*To all whom it may concern:*

Be it known that I, CHARLIE W. HAAS, a citizen of the United States, residing at Peoria, in the county of Peoria and State of Illinois, have invented certain new and useful Improvements in Marker Attachments; and I do hereby declare that the following is a full, clear, and exact description of the invention, which will enable others skilled in the art to which it appertains to make and use the same.

This invention has reference to a marker-attachment for agricultural implements and especially seed-planting machines.

One of the objects of the present invention is to provide a marker-attachment for seed-planting machines which is capable of being applied to the frame of any of the well known types of planters, and includes a lifting means for the marker-bar which is simple in construction, efficient in operation and so located, with reference to the driver's seat, on the planter, that he may readily operate the same with his foot.

That the invention may be more fully understood, reference is had to the accompanying drawings, in which:—

Figure 1 is a perspective view of my improved marker-attachment; Fig. 2 is a longitudinal sectional view; Fig. 3 is a side-elevation of the attachment, showing the same applied to a planter frame, and Fig. 4 shows a modified connection for the marker-bar, when said bar is a round-bar.

Like numerals indicate corresponding parts throughout the figures.

I am aware that "markers" for seed-planting machines have been in use for a considerable length of time; I am also aware that lifts of one kind and another have been suggested for moving the "marker" from one side of the machine to the other, but in the one instance I make no claim to the "marker" itself, nor to its mode of attachment to the marker-bar, and in the other instance, great difficulty and inconvenience has been experienced in applying the device to a planter frame, because such device or devices, in nearly every instance, has required a special construction of the frame of the machine and therefore could not be applied with success to machines already in the field. My attachment has been designed with a view of overcoming all these difficulties and so that the attachment can be applied to planters in the shop or field, and includes features of advantage, making it a very desirable attachment.

In the drawings, 1 denotes a portion of the usual planter frame, 2 the seat support, 3 the seat and 4 the brace for said seat.

5, in Figs. 1 and 3, denotes one form of marker-bar or staff, preferably rectangular in cross-section, while in Fig. 4, 6 denotes a marker-bar, which is preferably round, both styles of said bars being in common use.

To the inner end of the marker-bar are attached straps 7 which extend beyond the inner end of the marker-bar so as to form a connection between the marker-bar and lifting means, and said straps 7 are of sufficient length to form a suitable brace for the inner end of the marker-bar. If the straps 7 are to be connected with the marker-bar 5 shown in Figs. 1 and 3, said straps may be straight flat bars, as shown, and if said straps 7 are to be connected with the marker-bar 6 shown in Fig. 4, that portion of the straps, as at 8, which are secured to the bar 6, will be semi-circular in cross-section so as to conform to the contour of the marker-bar 6.

Disposed between and pivotally connected with the inner ends of the straps 7, by a pivot pin 9, is a coupling member 10, to which is secured the outer end of a shaft 11. The operation of the shaft 11 will rotate the coupling 10 and with it the marker-bar 5 or 6, whereby said marker-bar may be swung from one side of the planter to the other. The pivotal connection of the marker-bar with the coupling allows for swinging the marker-bar so as to throw the marker at an angle to the line of draft, if it is desirable. It often occurs that the marker-bars vary a little in width and diameter, in which case, it may be necessary to interpose washers 12, between the coupling 10 and the straps 7, see Fig. 2.

13 denotes a bracket, having the horizontal elongated body portion 14 formed with bearings 15 at its opposite ends, and the depending body portion or ear 16, by means of which the bracket is attached to the planter frame; said body portion 16 having a slot 17 extending lengthwise thereof to provide for the attachment and adjustment of the bracket to different styles and depths of planter frames.

When assembled, the bracket 13 is attached to a planter frame, somewhat in the manner seen in Fig. 2, the shaft 11 having been passed through the bracket 13 and its outer end secured in the coupling 10 to which the marker-bar is pivotally attached, as described. A washer 18 is interposed between the rubbing faces of the coupling and bracket.

The inner end of the shaft 11 is elbow-shaped or formed with the crank 19, and to the outer end of the crank 19 is attached the foot-piece 20. This foot-piece is so connected to the crank 19 that it is free to oscillate or rotate on the crank whereby the dished or foot engaging portion of the foot-piece will assume a flat or horizontal position and thus enable the operator to readily engage the same from the planter seat, so as to rock or rotate the shaft 11 and thereby swing the marker-bar.

Having thus fully described my invention, what I claim and desire to secure by Letters Patent of the United States, is:—

1. In a marker-attachment for planters, in combination, a bracket having a bearing portion and a right-angle body portion which has a slot, a shaft journaled in the bearing of said bracket, said shaft formed with a crank-portion, a foot-piece attached to said crank and in such a manner that said foot-piece will assume a flat position at all times, and a coupling attached to the opposite end of said shaft, said coupling adapted to have pivotally connected therewith a marker-bar.

2. In a marker-attachment for planters, in combination, a bracket formed with a bearing portion and a depending body-portion, a shaft journaled in said bearing and having a crank formation at one end, a foot-piece connected with said crank, a coupling fixedly attached to the opposite end of said shaft, and a pair of straps having a pivotal connection with said coupling and adapted to carry a marker-bar.

3. In a marker-attachment, in combination, a marker-bar, straps secured to said bar and projecting beyond the end of said bar, a coupling pivotally connected to and between the ends of said straps, a bracket having longitudinal bearing portions and a transverse supporting portion, a shaft journaled in the bearings of said bracket and having one end secured in said coupling, a crank on the opposite end of the shaft, and a foot-piece attached to said crank.

In testimony whereof I affix my signature, in presence of two witnesses.

CHARLIE W. HAAS.

Witnesses:
CHAS. W. LA PORTE,
GEORGE HAAS.